March 29, 1960

H. S. ROWTON ET AL 2,930,076

MACHINES FOR FILLETING FISH

Filed Aug. 28, 1956

INVENTORS:
HAROLD STANLEY ROWTON
CHARLES THAW
ROBERT ROBERTSON
BY

Richardson, David and Nordo
ATTORNEYS.

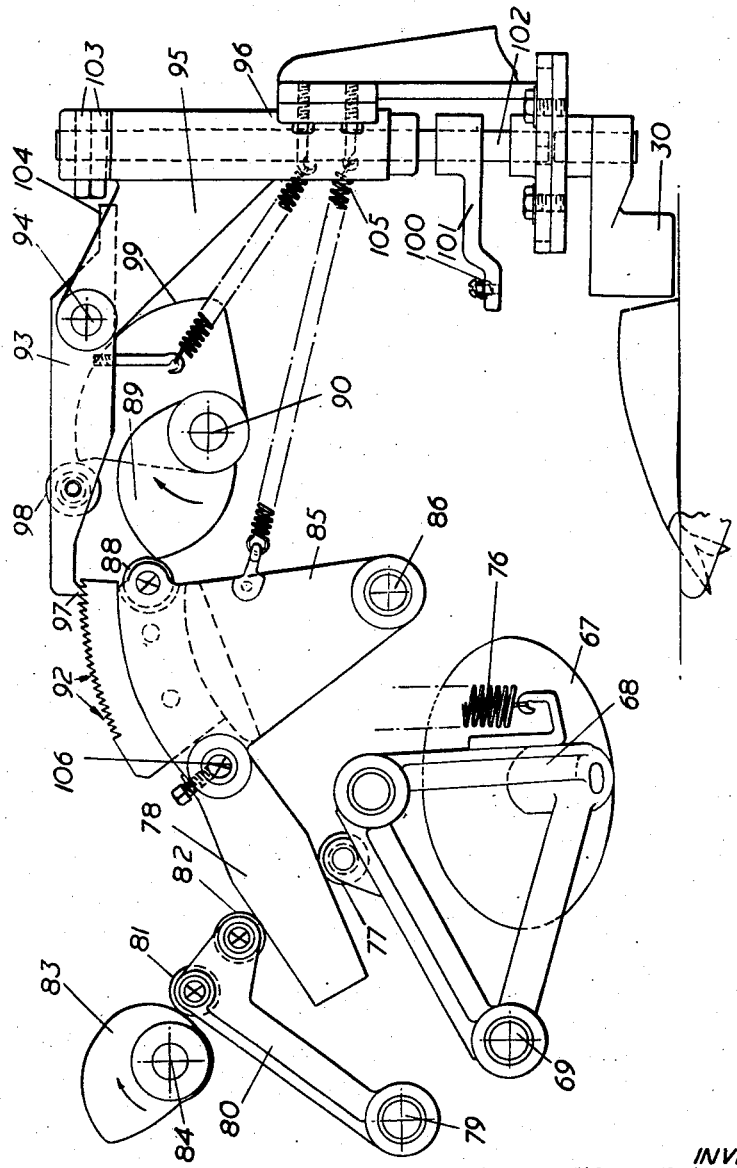

March 29, 1960    H. S. ROWTON ET AL    2,930,076
MACHINES FOR FILLETING FISH
Filed Aug. 28, 1956    5 Sheets-Sheet 3
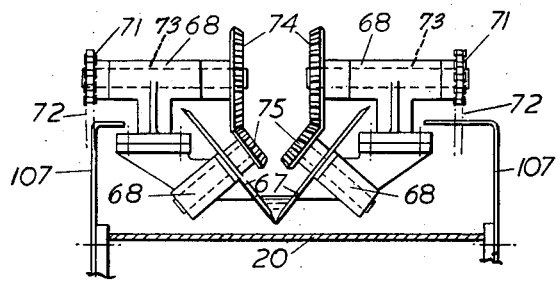
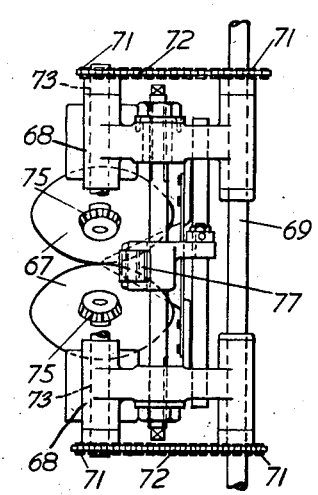
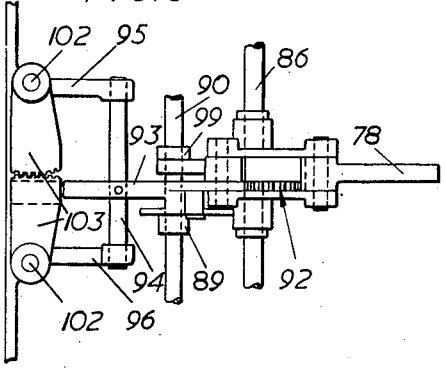
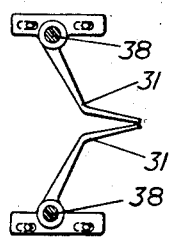
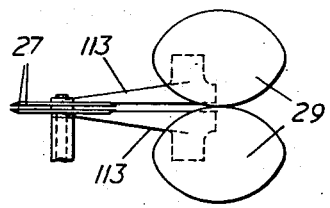
INVENTORS:
HAROLD STANLEY ROWTON
CHARLES SHAW
ROBERT ROBERTSON
BY
Richardson, David and Verdon
ATTORNEYS.

March 29, 1960   H. S. ROWTON ET AL   2,930,076
MACHINES FOR FILLETING FISH
Filed Aug. 28, 1956   5 Sheets-Sheet 4
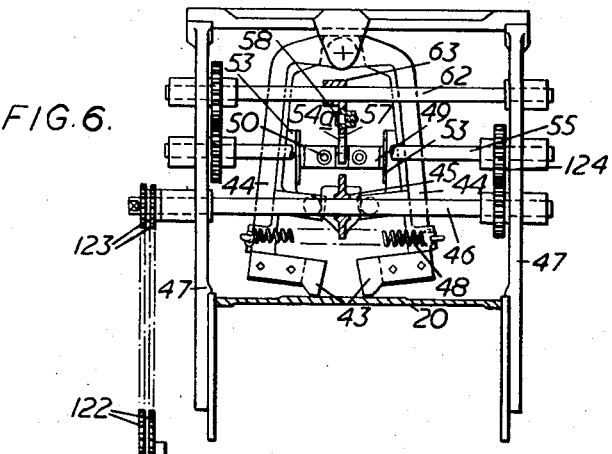
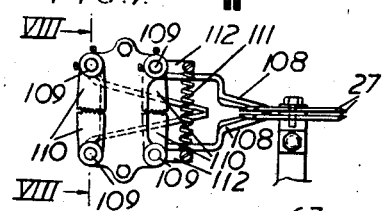
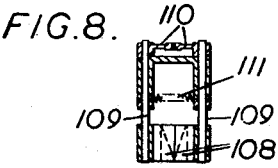
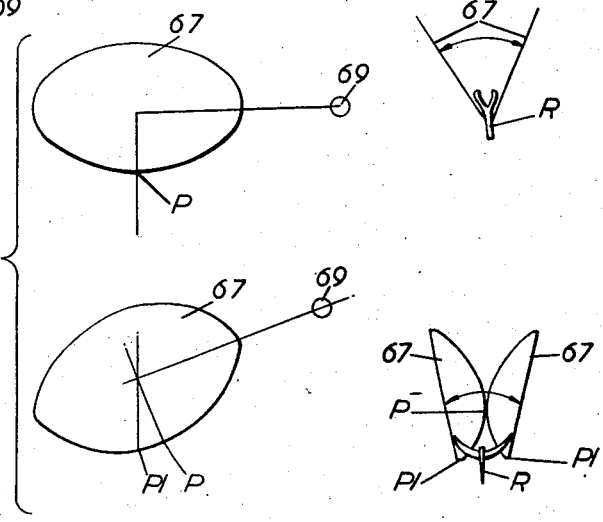
INVENTORS:
HAROLD STANLEY ROWTON
CHARLES SHAW
ROBERT ROBERTSON
BY
Richardson, Davis and Verdon
ATTORNEYS.

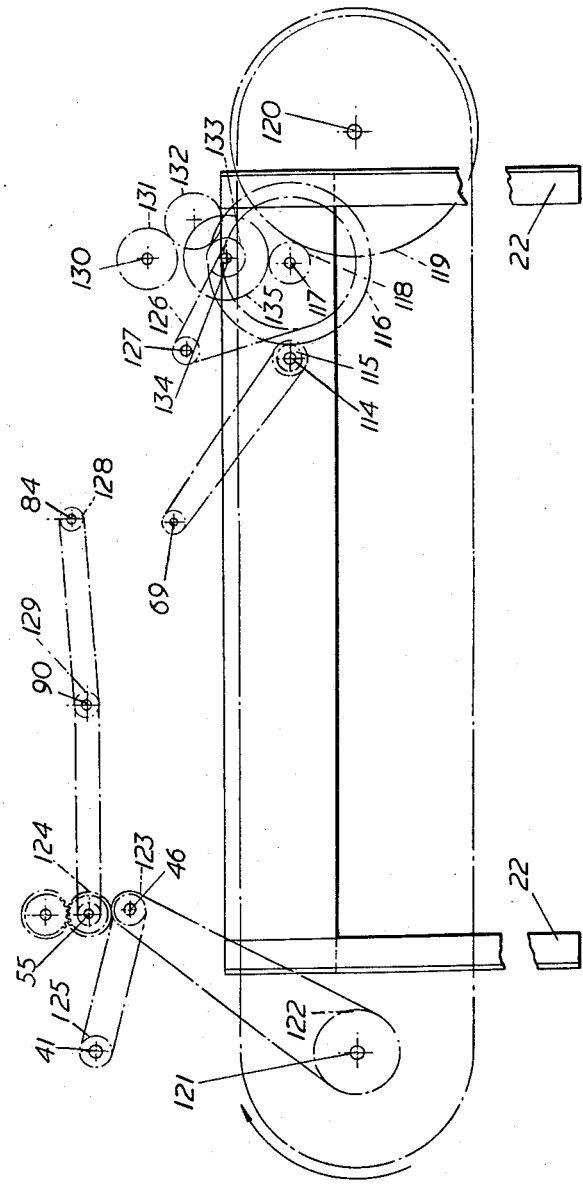

United States Patent Office 2,930,076
Patented Mar. 29, 1960

2,930,076

MACHINES FOR FILLETING FISH

Harold S. Rowton, Charles Shaw, and Robert Robertson, Aberdeen, Scotland

Application August 28, 1956, Serial No. 606,698

Claims priority, application Great Britain August 29, 1955

4 Claims. (Cl. 17—3)

This invention relates to machines for filleting of fish.

The invention is concerned with that type of fish for example, haddock, cod and whiting, having a prismatic bone structure at some part thereof. The common formation of bone in this type of fish, considering the fish lying on its back, belly uppermost, for the sake of simplicity, is that the bone in the region of the belly is prismatic, that is to say comprises a vertical part on the underside and two upwardly and diverging parts or rib bones each extending roughly at 120° to each other and the vertical part, having a common intersection at the backbone, or more correctly the rib bones may subtend an angle between them of about 100°, the angles between the rib bones and the vertical bone thus being about 130°. With the fish in the normal swimming position back upmost the vertical part is at the top and the rib bones extend downwardly at about 130° on each side therefrom, the belly lying below and towards the side bones. However in certain fish-filleting machines it is common to fillet the fish lying belly up, on their back, but of course they may be filleted in other orientations. The remainder of the fish from the belly cavity to the tail has all vertical bone without the rib bones, such vertical bone being a continuation of the vertical bone at the belly but being both below and above the backbone; but it is common for the backbone and such rear part of the vertical bone to be inclined at an angle somewhat downward and rearward from that of the prismatic bone, again considering the fish belly upmost, that is to say the backbone and vertical part does not usually extend in a straight line throughout the length of the fish.

In general the angle between the rear and prismatic parts of the vertical bone is the same for different sizes of each species of fish, but it varies between different species, i.e. between a haddock and a whiting, for example.

The invention is further mainly concerned with the formation of double, butterfly, or "block" fillets which are fillets comprising the two sides or halves of the fish joined together along the back, but it has certain applications to single fillets, that is to say one side or half of the fish alone. Where smaller fish are being used it is more convenient to market them in double fillet form so as to attain a convenient weight of flesh. The fish may be either ungutted or gutted before filleting.

Any convenient method may be effected for conveying the fish relative to the filleting means; for example the fish may be pulled by its tail along a flat surface, may be moved tail first along a straight path on a conveyor which is horizontal or at any convenient angle.

A main object of the invention is to provide means for filleting prismatic boned fish with a low loss of flesh arising from the fillets.

The invention therefore comprises in or for a machine for filleting fish with prismatic bone structure, filleting means comprising a cutting device for making inclined cuts from opposite sides of the fish through the outer skin thereof just outside of the rib bones of the prismatic structure inwards towards the backbone, means for effecting relative conveying movement between the fish and said cutting device longitudinally of the fish, and means for effecting relative advancing movement between said cutting device and the fish progressively more deeply into the fish during said conveying movement so that said cuts follow close to the rib bones along the fish.

The invention may include means for conveying the fish tail first past said cutting device, and means for advancing said cutting device towards the fish at a predetermined timing relative to said conveying means so as to provide inclined cuts just outside of the rib bones at the region of the prismatic bones only.

Means may be provided for adjusting the rate of advancing movement of said cutting device more deeply into the fish in order to vary the longitudinal inclination of the zone of cut to correspond to different longitudinal inclinations of prismatic bone structure.

Means may be provided for adjusting said advancing movement so that while it is effective at the same or a different longitudinal inclination the zone of cut is as a whole displaced towards or away from the fish so as to provide for different sizes of the same species. The adjustment of said advancing movement may be effected by feeler mechanism which measures the length of the fish and correspondingly adjusts the advancing means.

The invention may comprise means for effecting two parallel splitting cuts one on each side of the vertical part of the backbone. Such splitting cuts may be continued right through to the back of the fish to provide two single fillets; or they may stop short of the back of the fish to provide a double fillet; while means may be provided for limiting said splitting cuts to that region of the fish between the tail and the belly.

The invention may comprise a pair of mutually inclined rotary boning knives past which the fish is moved, said knives maving a V-shaped incision which cuts out the backbone and associated vertical bone.

An embodiment of the invention as applied to a machine for providing double fillets will now be described, by way of example, with reference to the accompanying drawings, in which:

Fig. 2 is a side elevation, to an enlarged scale, of the cutting device for removing the rib bones of prismatic structure and its movement-controlling means;

Fig. 3 is a fragmentary vertical sectional view of Fig. 1;

Fig. 4 is a fragmentary plan view of Fig. 3;

Fig. 5 is a fragmentary plan view of the cutting device movement-controlling means;

Fig. 6 is an enlarged section on the line VI—VI of Fig. 1;

Fig. 7 is a plan view of the fish guides and parallel splitting knives;

Fig. 8 is a section on the line VIII—VIII of Fig. 7;

Fig. 9 is a detail view of a feeler device;

Fig. 10 is a plan view of fish-opening guides;

Fig. 11 shows diagrammatic views of the cutting device in the raised and lowered conditions; and Fig. 12 is a schematic arrangement of the driving connections of the machine.

Figure 1:
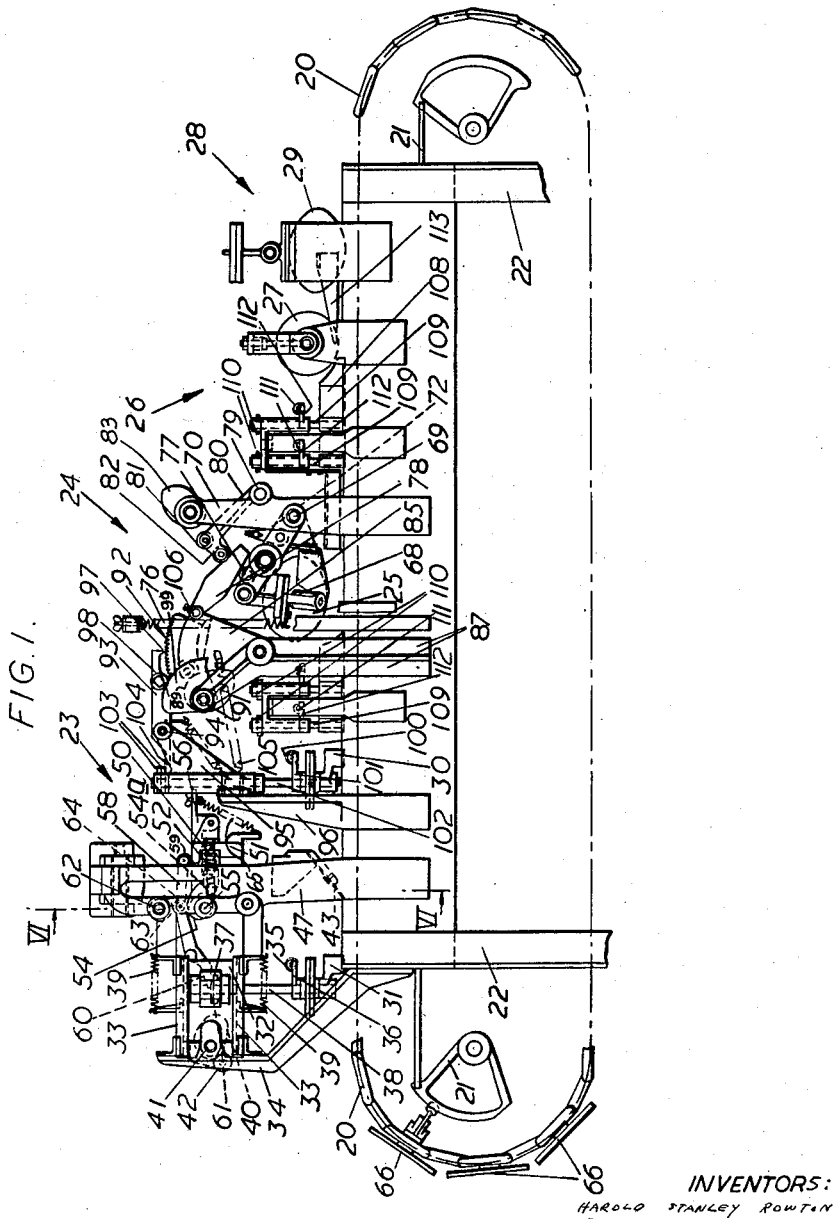
Fig. 1 is a side elevation of a machine according to the present invention certain parts being broken away for the sake of clarity.

The filleting machine will firstly be described in a general manner with reference to Fig. 1 of the drawings.

The machine comprises an endless travelling conveyor 20 mounted on a framework 21 provided with legs 22 for supporting the machine on the ground.

In accordance with the usual method a fish is pulled through the machine on the horizontal conveyor 20 past various stations in succession to effect different component filleting operations, the fish being pulled tail first with the belly upwards. The head is first cut off at a decapitating station 23, and at a subsequent station 24 two cuts are made by opposed inclined rotary knives 67 arranged in V-formation, the knives entering the fish just rearward of the belly and gradually being lowered relative to the fish so that they cut a V-shaped incision, thus at each side cutting just below or outside the backbone and rib bones of the prismatic formation, the knife edges nearly touching each other as more fully explained hereafter, so that there is complete removal of the rib bones and belly flesh. With the fish lying on its back and as aforesaid the rear part of the vertical bone inclines slightly upwardly towards the head, while the prismatic part inclines somewhat downwardly towards the head, and the gradual lowering of the knives as the fish passes ensures that the knives 25 cut just outside said rib bones of the prismatic formation throughout the travel. The knives 25 thereafter return to the original upper position. The knives 25 are pre-set at the required angular relationship on mutually fixed axes, e.g. each being at 50° to the vertical, thus subtending between them an angle of about 100° in the plane of the axes.

This leaves the whole of the vertical bone in the fish, and at a subsequent station 26 two vertical cuts are made by a pair of rotary disc knives 27, one on each side of the vertical bone of a depth roughly equal to the depth of the vertical bone, and these cuts are made just short of the back surface of the fish at a uniform distance from the surface of the conveyor 20 on which the fish is moved through the machine.

At a subsequent station 28 another pair of mutually inclined rotary boning knives 29 make inclined cuts along the fish, the side parts of the fish meantime having been opened out somewhat by a guide so as to expose the vertical bone, and this further pair of cuts removes the vertical bone and remaining backbone completely.

At a subsequent station (not shown) the tail may be cut off and at a later stage, usually in a separate machine, whether or not the tail is cut off, the skin may be removed.

For some purposes the first mentioned V-cut at station 24 may be sufficient, leaving the fish with only the vertical part of the bone. Alternatively such first V-cut followed by the two vertical splitting cuts at station 26 may suffice if the splitting cuts are continued right down to the back surface of the fish, thus leaving two single fillets with the bones fully removed. Alternatively if the splitting cuts are stopped short of the back, a double fillet is left, and at a subsequent station (not shown) parallel circular knives may sever the flesh on opposite sides of the dorsal fins to form two single fillets.

In a modification, the first V-cut may be effected to remove the rib bones, and then the two vertical cuts may be effected but only from the tail to the beginning of the belly cavity, thus leaving the vertical part of the bone still joined to that part of the fillet below the belly cavity.

As regards the mutually inclined disc knives 25 which remove the rib bones of the prismatic structure (hereinafter referred to simply as the rib bone knives), these may be lowered in a straight line inclined at a particular angle relative to the fish support, depending upon the bone structure, but any non-straight line or zone of cutting advancement may be designed in accordance with particular requirements, e.g. in a curve. For the sake of simplicity we will consider hereafter a straight line zone. Normally a batch of fish of the same species will be filleted successively in the machine, and an adjustment will be necessary automatically to allow for such fish of larger or smaller sizes, this corresponding to lowering or raising of the said line or zone. This will normally be done at the station 24 by means of feelers 30 which measure the length of fish passing from the decapitating station 23 and thereby automatically adjust the zone of travel of the knives 25.

For different species of fish the inclination of the zone may vary, and this will call for another form of adjustment. The adjustment for different species of fish will normally be effected manually before filleting a batch thereof.

Thus before passing the rib bone knives 25 the fish may pass between a series of opposed flapper guides spring urged towards each other, the first comprising a pair of timing guides or feelers which are forced apart by the fish and close as soon as the end of the belly (the head being removed) passes same, thus to obtain a measure of the length of fish. The fish may pass between two further pairs of flapper guides to maintain it in the straight position relative to the knives and the edges of the knives may slightly overlie the guides nearest in advance to same.

The various fish-treating stations will now be described in detail.

The decapitating station 23 (Figs. 1, 6 and 9) comprises a feeler device consisting of a pair of pivoted flaps 31 at right angles to the conveyor surface and mounted on a crosshead 32 slidable in a direction longitudinally of the machine in crosshead guides 33 forming part of a stationary frame 34 secured to the framework 21. The flaps 31 are urged to close upon each other in V-formation (Fig. 9) by means of a spring or springs 35 carried by arms 36 abutting against the flaps 21 which are opened apart, against the action of the spring or springs 35, by the passage of the fish between them. The flaps 31 also serve to present the fish to the decapitating device in a position at right angles to the conveyor 20. The flaps 31 are intergeared for simultaneous opening and closing movement by means of toothed quadrant levers 37 secured to the upper ends of flap-carrying posts 38. The crosshead 32 normally holds the feeler device in an initial position adjacent the decapitating device by means of springs 39 each secured at one end to the stationary frame 34 and at the other end to the slidable crosshead 32. Movement of the crosshead 32 away from the decapitating device is controlled by means of a cam 40 secured to a transverse shaft 41 journalled in the stationary frame 34 and coacting with a roller 42 mounted on the crosshead 32. The cam-shaft 41 is rotated in time relationship to the conveyor 20 as later described, and when the highest part of the cam 40 secured to the shaft 41 coacts with the roller 42, the crosshead 32 and feeler device will be moved to an extreme position away from the decapitating device.

A low part of the cam 40 of constant radius coacts with the roller 42 for a sufficient period of time to cause the crosshead 32 to remain stationary until the conveyor has moved forward for a predetermined distance as hereinafter described. The decapitating device comprises a pair of cooperating knife blades 43 movable in a cutting plane across the surface of the conveyor 20 and movable apart to allow the undecapitated fish to pass between them. The knife blades 43 are supported at the lower ends of hinged arms 44 opened apart, immediately after a decapitating operation, by a crown cam 45 secured to a cam shaft 46 journalled in the side members of a framework 47 supporting the decapitating device. The cam shaft 46 is rotated by means later described; a thickened portion of the cam 45 passing between the knife arms 44 and forcing them apart against the action of a spring 48 connecting the knife arms 44 and normally pulling them towards each other.

Means are provided for holding the knife blades 43 apart until the fish passes out of contact with the feeler device and comprise a spring-released locking element 49 guided for longitudinal movement on guide rods 50 secured at one end to a stationary member 51. Springs 52 are carried on the guide rods 50 for normally urging the locking element 49 into a position in which it is out of engagement with projections 53 on the hinged knife arms 44, thus permitting the latter to be pulled towards each other by the spring 48. When the arms 44 have been parted by the crown cam 45, the locking element 49 is moved into a position between the projections 53, by means of a cam 54 mounted on a transverse shaft 55 journalled in the framework 47 and rotatable by means later described. The cam 54 engages a roller 54a mounted in a slot in the locking element 49 and serves, for a part of each revolution of shaft 55, to urge the locking element 49 into a position between the projections 53 against the action of the springs 52.

The decapitating device is normally held inoperative by locking as above described the knife blades 43 in the open position, until the fish passes out of contact with the feeler device, whereupon means for controlling the decapitating device is actuated to cause decapitation regardless of whether the feeler device is in its initial position or extreme position or in any intermediate position. For these purposes a sprng-released detent 56 is provided pivoted to the stationary member 51. The detent 56 has a nose portion which, when the feeler device is open and the locking element 49 has been urged between the projections 53, is pressed into the slot in locking member 49 to engage an abutment 57 on the locking element 49 by means of a cam-controlled lever 58 pivoted to and movable longitudinally with the slidable crosshead 32. One end of the lever 58 is provided with a roller 59 engaging the head of the detent 56, and the other end of the lever 58 is provided with a tail piece 60 which engages and rides on one of the toother quadrant levers 37. An abutment 61 is provided on the engaged quadrant lever 37 for engagement beneath the tail piece 60.

A transverse shaft 62 journalled in the framework 47, and rotatable by means later described, is provided with a cam 63 secured thereto and operative to bear on a roller 64 on the lever 58. When the slidable crosshead 32 carrying the flaps 31 is in its position nearest the knife blades 43, the roller 64 is underneath the cam 63. After the cam 54 has moved the locking element 49 between the projection 53 on the knife arms 44, the roller 64 on the lever 58 is engaged by the high portion of the cam 63, thus rocking the lever 58, so that the roller 59 bears on the top of the detent 56, forcing said detent down against the pressure of a spring 65, so that the abutment 57 on the locking element 49 is held by the nose piece of the detent 56. Also, when the lever 58 is rocked by the cam 63, the tail piece 60 of the lever 58 is raised, permitting the abutment 61 on the toothed quadrant lever 37 to be moved beneath said tail piece 60 when the flaps 31 are opened by the passage of a fish between them. The cam 63 is rotated in timed relation to fish carrying conveyor plates 66, and is so timed that the low portion of the cam 63 is above the roller 64 just before the flaps 31 close together as they ride off the nose of a fish of minimum length so that, when the flaps 31 are closed together by means of the spring 35, the abutment 61 is disengaged from below the tailpiece 60 of the lever '8 by the movement of the quadrant 37 secured to the flap carrying post 38, thus permitting the lever 58 to be urged upwards by the pivoted detent 56 bearing on the roller 59 due to the pressure of the spring 65. The said detent 56 thus releases the locking element 49. Disengagement of the detent 56 from the abutment 57 on the locking element 49 permits the latter to be urged out of engagement with the projections 53 on the pivoted knife arms 44 which being pulled together by the spring 48, will pull the knife blades 43 towards each other to decapitate the fish passing therebetween. The cam shaft 55 is intergeared with the cam shaft 62 so that, when a low part of cam 63 permits the lever 58 to be lifted, a low part of the cam 54 engaging the roller 56 allows the locking element 49 to be urged out of engagement with the knife arms 44. Moreover, the shaft 46 is intergeared to the shaft 55 so that the thickened portion of the cam 45 is out of engagement with the knife arms 44 when the cams 63 and 54 are in a position permitting actuation of and closing of the knife arms 44 to effect decapitation.

The knife blades 43 are arranged to overlap when decapitating the fish, and constructed or arranged so as either to completely sever the head of the fish from the body thereof, or to cut through the fish so as to leave the entrails of the fish. In such latter case, when the body of the fish is drawn away from the head due to the forward movement of the conveyor 20, the entrails remain attached to the head.

It is explained that, given the minimum length of a fish as being six inches, the average length of the head thereof is approximately one inch, and increases in length by approximately ¼ inch for each inch increase in the length of the fish, so that a fish of a maximum length of twelve inches, has a head roughly 2½ inches in length. These dimension are given only as a convenient example.

The machine is adapted to operate on fish of various lengths. With a fish of a length of say six inches or less passing between the feeler device, the flaps 31 thereof will close before the crosshead 32 and feeler device are moved by the cam 40, the closing of the feeler flaps 31 will actuate the decapitating device in the manner previously described. The driving mechanism for the cam shafts 46, 55, 62 and 41 are such that, when the feeler device is in its initial position in readiness to receive the fish, the cams 45, 54 and projection 53 are in the position shown in Fig. 6 and the knife blades 43 are releasably locked in the open position as already described. When a fish of more than minimum length is presented to the feeler device, the feeler flaps 31 are unable to close until the additional length of the fish has passed therethrough, and during the passage of the additional length of fish through the flaps 31, the crosshead 32 and feeler device are moved by cam 40 towards their extreme position away from the knife blades 43.

On the basis of the foregoing data, the crosshead 32 and feeler device are conveniently arranged to be moved through a maximum distance of, say, 1½ inches (due to the throw of cam 40) from the initial position where the feeler flaps 31 are, say, one inch from the knife blades 43, to an extreme position where the feeler flaps 31 are a distance of 2½ inches from the knife blades 43. Thus, when the feeler flaps 31 do close to actuate the decapitating device, the length of head cut off from the fish will correspond to the distance between the feeler flaps 31 and the cutting blades 43.

The decapitated fish is then carried by the conveyor 20 to station 24, whereat the rib bones and belly flesh of the fish are removed.

Station 24 (Figs. 1 to 5) comprises a cutting device for making the inclined cuts along a progressively advancing zone consisting of two mutually inclined or angulated knives 67 mounted on bearings 68, these bearings being rigidly connected together to form a unit, the complete unit being pivoted on a cross shaft 69 journalled in bearings on a part 70 of the frame of the machine. This pivot shaft 69 also serves as a driving shaft to rotate the knives 67 through a chain-and-sprocket drive 71, 72, shafts 73 and bevel gearing 74, 75. The cutting device or knife unit is suspended by springs 76 from the machine frame so that when the device is moved by means hereinafter described towards the conveyor 20 for the fish the springs 76 are tensioned. The included angle between the rib bones increases from the tail end of the prismatic section to the head end. It is necessary that the knives 67 cut on the outside of the rib bones otherwise these bones will be left attached to the fillet. This means that the angle between the knives 67 in a plane at right angles to the conveyor should increase from tail end to head end of the prismatic section.

By a suitable interrelationship between the height of the pivot shaft 69 above the conveyor 20, the height of the bottom edge of the knives 67 from the conveyor 20 when the plane through the axis of the knives 67 is at right angles to the conveyor, the included angle between the cutting knives 67, and the radius from the pivot 69 to the point of contact of the two knives 67, the desired effect may be achieved.

At only one position of the knife unit is the plane through the axis of the knives at right angles to the plane of the conveyor 20 and consequently as the knife unit moves from this position in a downward direction, in any plane parallel to the plane of the conveyor and at any fixed height above the conveyor track, the width between the leading cutting edges of the knives increases as the knife unit approaches the conveyor track, thus compensating for the aforesaid increase in the included angle between the rib bones. In Fig. 11 the cutting point of the knives 67 in the raised or up position is indicated at P. When the knives 67 are moved to the lowered or down position the angle between the knives 67 becomes more acute, but this angle does not represent the angle of section cut out as the cutting out is performed by the knives from P to P1. The difference in height between points P and P1 does not affect the correct removal of the rib bones R as the point P cuts under the junction of the rib bones R and the latter slope from P to P1. The angle between the knives on the plane at right angles to the conveyor track also becomes less as the unit approaches the conveyor track, and vice versa, thereby enabling cutting out the prismatic section of the bone with the minimum loss of flesh.

To enable fish of varying sizes to be dealt with it is necessary to provide mechanism to regulate the height of the knives 67 above the conveyor plane to correspond to the position of the prismatic section of the backbone. The slope of the prismatic section relative to the conveyor plane is the same in all fish of the same species, irrespective of size. The dimension in which the greatest variation occurs is that of length and generally all other proportions are proportional to the length, so that measurements of length may be converted to those of height. It is thus necessary to raise the height of the line of cut of the bottom edges of the knives 67 from the conveyor plane to deal with any fish larger than the predetermined minimum.

The mechanism to perform this function is now described. The knife unit as previously described carries a centrally disposed roller 77 which is in contact with the lower face of a pivotally mounted tapered arm 78. Pivotally mounted on a fixed shaft 79 parallel to the pivot shaft 69, is a lever 80 carrying two rollers 81 and 82 on the end furthest from the pivot, the roller 82 being in contact with the upper face of the tapered arm 78 and the roller 81 coacting with a cam 83 mounted on a shaft 84 supported in frame part 70. Angular displacement of the lever 80 by the cam 83 is transmitted to the tapered arm 78, and any displacement of that arm 78 causes a proportional displacement of the cutting device.

The tapered arm 78 is pivotally mounted on one corner of a sector piece 85, pivotally mounted on a shaft 86 fixed in brackets 87 on the main frame of the machine. The other corner of the sector piece 86 carries a roller 88 which coacts with a cam 89 carried on a cam shaft 90 journalled in bearings 91 mounted on the frame of the machine. The peripheral arc of the sector piece is in the form of ratchet teeth 92, and a pawl 93 pivotally mounted on a shaft 94 carried by brackets 95 secured to a stationary part 96 of the machine frame is so placed that the nose piece 97 of the said pawl 93 can engage or disengage the ratchet teeth 92 when the pawl 93 is rocked. A roller 98 mounted on the pawl 93 is engaged by a cam 99 mounted on the cam shaft 90. This roller 98 and cam 99 serve to lift the nosepiece 97 of the pawl 93 out of engagement with the ratchet teeth 92 at a predetermined time.

A pair of fish guides is provided in the form of the pair of feelers 30 pivoted at right angles to the conveyor surface, said pivoted feelers being mounted on the stationary part 96 of the machine frame and urged together in V formation by a spring or springs 100 connecting arms 101 secured to rotary rod 102 carrying the feelers 30. These guide feelers 30 are intergeared for simultaneously opening and closing by gear segments 103 carried by the rods 102, so arranged that when the feelers 30 are in their open position the gear segments 103 engage the tailpiece 104 of the pawl 93 and hold the nosepiece 97 of the pawl 93 out of engagement with the ratchet teeth 92. When the guide feelers 30 close together the gear segments 103 release the tailpiece 104 of the pawl 93 thus permitting the nosepiece 97 to engage the ratchet teeth 92, so preventing any further angular displacement of the sector piece 85 due to the pull of tension springs 105.

The tapered arm 78 is pivotally mounted on the sector piece 85 as indicated at 106, and angular displacement of the sector piece 85 away from the knife unit will decrease the distance between the roller 77 and the roller 82 on the lever 80, which is in contact with the top face of the tapered arm 78. This decrease in distance between the two rollers 77 and 82 will cause an angular displacement of the lever 80, since the knife unit and consequently the knife unit roller 77 is limited in its upward movement by stops 107, and the lever 80 is free to swing. This displacement of the lever 80 consequently moves the roller 81 coacting with the cam 83 further away from the cam face, so that before the cam 83 can engage the roller 81 on the lever 80 and commence downward displacement of the knife unit, the cam 83 must rotate through an angle equivalent to the rotation which would have displaced the lever 80 an amount equal to the displacement already given by the movement of the tapered arm 78. During this partial rotation of the cam 83 the conveyor 20 will have travelled forward a proportional distance.

From the above description it will be seen that the greater the angular movement of the sector piece 85, and consequently the movement of the tapered arm 78, away from the knife unit, the later in point of time, relative to the movement of a point (say the fish tail grip) on the conveyor 20, will the knife unit commence to move downwards, and consequently the higher will be the line of cut of the bottom edges of the knives 67 in the fish. The amount of movement of the sector piece 85 is controlled by the pawl 93 and ratchet teeth 92 which are in turn controlled by the gear segments 103 and guide feelers 30, so that the longer the fish the greater will be the movement of the sector piece 85 away from the knife unit and consequently the higher will be the line of cut.

The cycle of operations is as follows. When one tail grip is at a predetermined distance past the knife unit, this distance being greater than the maximum length of fish processed by the machine, the roller 81 on the lever 80 coacting with the low part of the cam 83, permits the knife unit to be returned to its "up" position by spring means 76, the knife unit's upward movement being limited by the stops 107. At the same time the pawl 93 is lifted by cam 99 co-acting with the roller 98 and held out of contact with the ratchet teeth 92. The sector piece 85 is then swung due to the cam 89 co-acting with the roller 88 towards the knife unit, and during this movement the travel of the conveyor 20 has carried the succeeding tail grip past the guide feelers 30 so that if a fish tail is held in the grip the passage of the fish would have opened the feelers 30, thus partially rotating the gear segments 103, so that they engage the tail piece 104 of the pawl 93 and hold the nosepiece 97 of the pawl 93 out of contact with the ratchet teeth 92 until the fish passes out of contact with the feelers 30 and permits them to close.

The second cam 89 is set so that the roller 88 in the sector piece 85 is in contact with the highest part of the cam 89 at the time when the guide feelers 30 would close together after the passage of a fish of minimum length. During the passage of any fish of greater length than the predetermined minimum the sector piece 85 engages progressively lower parts of the second cam 89, until the fish passes out of contact with the feelers 30 thus permitting the pawl 93 to engage the ratchet teeth 92 and prevent any further movement of the sector piece 85 away from the knife unit.

Continued travel of the conveyor 20 brings the fish into operative position relative to the knife unit which is displaced progressively downwards to cut out the prismatic part of the backbone. The cam 83 coacting with the roller 81 on the lever 80 and acting through the tapered arm 78 displaces the knife unit downwards, the height of the line of cut depending as previously described on the length of fish. After the knife unit completes its downward travel the cycle of operations recommences. Guide means as hereinafter described with reference to station 26 is provided between feelers 30 and the knife unit.

The angle of the prismatic section of the bone to the plane of the conveyor 20 generally varies with different species, e.g. between haddock and whiting, the former being steeper, and to obtain the maximum amount of fillet from the fish the line of cut should be varied to suit the species of fish being filleted. The height of the line of cut at any specified point on the fish (say five inches from the tail) will also vary with different species, on fish of corresponding lengths. Two methods of altering the angle of cut and the height of the line of cut for different species are described below.

Method 1.—The alteration of the angle of cut and the height of the line of cut at any specified point on the fish may be effected by having a series of cams (each cam corresponding to a different species) mounted on the shaft 84 of the cam 83 in such manner that the cam corresponding to the species of fish being filleted may be moved into contact with the roller 81 on the lever 80, the remaining cams rotating with the shaft 84 out of contact with the said roller 81.

Method 2.—The height of the line of cut at any specified point may be varied by replacing the tapered arm 78 by a similar tapered arm having more or less taper as required to give the desired result. By replacing the tapered arm 78 by a similar arm having a different taper the angle of the line of cut relative to the conveyor will also be varied. It will be evident that the distance between the point of contact of the roller 82 on the lever 80 and the top face of the arm 78 and of the roller 77 and the lower face of the tapered arm 78, increases as the knife unit is moved downwards, because of tilting of the tapered arm 78. To obtain the correct line of cut of the bottom cutting edges of the knives 67 since the distance between the two points of contact increases as the tool descends, the contour of the rise of the cam 83 must be such that unit angular rotation of the cam 83 corresponds to unit displacement of the knife unit. Now if the tapered arm 78 is replaced by a similar arm having a different taper the original downward displacement is varied being less if the taper is greater and vice versa. This variation in the downward displacement, while the angular rotation of the cam 83 is the same, means that the angle of the line of cut is also varied, and for certain species of fish the different taper required to obtain the correct height of the line of cut results in the angle of cut also being varied as required.

A fish after being treated at station 24 is then advanced by the conveyor 20 to station 26 whereat vertical cuts are formed on either side of the vertical bone which still remains in the fish.

Station 26 comprises resiliently urged guide flaps 108 pivotally mounted on posts 109 intergeared at their upper ends by toothed quadrant levers 110.

Station 26 also comprises spaced parallel rotatably driven disc knives 27 and a cam driven by mechanism (not shown) for moving the knives 27 towards and away from the surface of the conveyor 20 to enable the knives to enter the fish on each side of the backbone at the tail and cut to the belly to sever the flesh therefrom and then rise clear of the fish.

The knives 27 make two parallel cuts, one along each side of the vertical bone of the fish, and the conveyor 20 moves the fish to station 28 whereat the vertical bone is removed.

Station 28 comprises a pair of guides 113 disposed one on either side of the knives 27 and diverging away from one another in a direction away from the knives 27, and the pair of mutually inclined rotary boning knives 29 also disposed between the guide 113. The guides 113 enter the cuts made by the knives 27 and guide the severed flesh on each side of the vertical bone past the boning knives 29, which cut out and remove the vertical bone.

It is to be noted that the flaps 108 are resiliently urged together by a spring 111 interconnecting a pair of arms 112 connected to the rods 109.

One advantage of the present machine is that during the cuts which removes the rib bones, the vertical or flat section of the backbone is left intact so that flakes of the fish flesh are not displaced.

The drive to the various stations of the machine (Fig. 12) comprises a driven mainshaft 114, located intermediate the feed and delivery ends of the machine. The drive to the conveyor 20 comprises a spur pinion 115 on shaft 114 in mesh with a spur pinion 116 carried on a shaft 117 located intermediate shaft 114 and the delivery end of the machine. Shaft 117 carries a further pinion 118 in mesh with a pinion 119 on a conveyor shaft 120 journalled in brackets at the delivery end of the conveyor 20. The usual conveyor chain drive extends between the shaft 120 and the conveyor shaft 121 journalled in brackets at the feed end of the machine. The drive to the cam 45 of the decapitating device comprises a chain drive from a spur pinion 122 on shaft 121 to a pinion 123 on shaft 46 which is provided with a further spur pinion in mesh with a spur pinion 124 on shaft 55. The shaft 55 is also in driving engagement by means of suitable spur pinions, with shaft 62. The drive to the cam shaft 41 operating the feeler device crosshead 32 comprises a pinion 123 on shaft 46 in chain driving engagement with a chain sprocket 125 on shaft 41. The shaft 69 of the rib bone knives 67 is in chain driving connection with a chain sprocket on shaft 114, and the knives 27 are driven by means of a chain drive 126 from shaft 117 to a shaft 127 carrying said knives. The cam shafts 84 and 90 are driven by chain sprockets 128, 129 respectively in chain driving engagement with a chain sprocket on shaft 55. A shaft 130 for driving the knives 29 of the boning wheel is provided with a spur pinion 131 in mesh with an idler spur pinion 132 which is itself in driven engagement with a spur pinion 133 carried on shaft 134 which carries a pinion 135 in mesh with pinion 118.

The individual operation of each station has already been described and only the general sequence of fish treating steps will be described.

In operation, a fish to be filleted is fed in to the machine by the conveyor 20 tail foremost to the decapitating station 23 whereat the head of the fish is removed. The decapitated fish is then moved by the conveyor 20 and guided to station 24, whereat the rib bones are removed, the vertical bone being left in the fish. The conveyor 20 then moves the fish to station 26, whereat the knives 27 form a cut along each side of the vertical bone. Finally, the fish is moved to station 28, whereat the guides 113 and knives 29 remove the vertical bone.

We claim:
1. In a machine for filleting fish with prismatic bone structure, conveyor means adapted to move said fish through said machine, filleting means comprising a cutting device including convergent blades for making inclined cuts from opposite sides of the fish through the outer skin thereof just outside of the rib bones of the prismatic structure inwards towards the backbone, said con- veyor means effecting movement of the fish past said cutting device longitudinally, and cutting device control means driven with said conveyor means for effecting penetrating movement of said cutting device progressively more deeply into the fish during said conveying movement so that said cuts follow close to the rib bones along the fish, said conveyor means comprising means for conveying the fish tail first past said cutting device, said cutting device control means including fish actuated means responsive to the size of the fish for causing penetrating movement of said cutting device towards the fish at a predetermined timing relative to said conveying means so as to provide inclined cuts just outside of the rib bones at the region of the prismatic bones only.

2. A machine according to claim 1, wherein said fish actuated means includes a cam, and a pivotally mounted arm actuated by the cam to urge the cutting device towards the conveying device.

3. A machine according to claim 2, further comprising a pivotally mounted lever extending between said cam and arm, and two rollers carried at one end of said arm, one of said rollers resting continuously on said arm and the other roller being engaged by said cam to pivot the lever and urge said arm and cutting device towards the conveying means.

4. A machine according to claim 1, wherein said cutting device comprises a pair of opposed inclined rotary knives arranged in V-formation and mounted so as to form a knife unit.

References Cited in the file of this patent

UNITED STATES PATENTS

| | | |
|---|---|---|
| 2,149,022 | Hunt | Feb. 28, 1939 |
| 2,180,303 | Baader | Nov. 14, 1939 |
| 2,381,560 | Savrda | Aug. 7, 1945 |
| 2,406,907 | Savrda | Sept. 3, 1946 |
| 2,552,984 | Leuschner | May 15, 1951 |
| 2,552,985 | Leuschner | May 15, 1951 |
| 2,563,008 | Danielsson | Aug. 7, 1951 |
| 2,577,686 | Hunt | Dec. 4, 1951 |